(12) United States Patent
Waters

(10) Patent No.: US 10,895,899 B2
(45) Date of Patent: Jan. 19, 2021

(54) REGULATION CIRCUIT TO FACILITATE USB CABLE COMPLIANCE

(71) Applicant: TEXAS INSTRUMENTS INCORPORATED, Dallas, TX (US)

(72) Inventor: Deric Wayne Waters, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 337 days.

(21) Appl. No.: 15/856,697

(22) Filed: Dec. 28, 2017

(65) Prior Publication Data

US 2018/0335819 A1 Nov. 22, 2018

Related U.S. Application Data

(60) Provisional application No. 62/509,545, filed on May 22, 2017.

(51) Int. Cl.
*G06F 1/26* (2006.01)
*G06F 1/28* (2006.01)
*H02M 3/137* (2006.01)
*G06F 13/40* (2006.01)
*G06F 13/42* (2006.01)

(52) U.S. Cl.
CPC ............ *G06F 1/266* (2013.01); *G06F 1/28* (2013.01); *G06F 13/4068* (2013.01); *G06F 13/4282* (2013.01); *H02M 3/137* (2013.01)

(58) Field of Classification Search
None
See application file for complete search history.

(56) References Cited

U.S. PATENT DOCUMENTS

| | | | |
|---|---|---|---|
| 9,158,325 B1 * | 10/2015 | Lim | H02J 7/0052 |
| 9,914,548 B1 * | 3/2018 | Vadillo | H02J 1/14 |
| 2016/0110305 A1 * | 4/2016 | Hundal | G06F 13/4022 |
| | | | 710/316 |
| 2017/0108910 A1 * | 4/2017 | Goh | G06F 13/385 |
| 2018/0097318 A1 * | 4/2018 | Golubovic | H01R 13/7137 |
| 2018/0152183 A1 * | 5/2018 | Vemula | G06F 13/4282 |
| 2018/0232021 A1 * | 8/2018 | Perchlik | G06F 1/203 |
| 2018/0248356 A1 * | 8/2018 | Klein | G06F 11/0745 |

\* cited by examiner

*Primary Examiner* — Fahmida Rahman
(74) *Attorney, Agent, or Firm* — Mark Allen Valetti; Charles A. Brill; Frank D. Cimino

(57) ABSTRACT

A circuit includes a regulation circuit configured to intercept messages on a configuration channel of a universal serial bus (USB) cable between a USB source device and a USB sink device. The regulation circuit regulates a source capability message from the USB cable configuration channel based on a predetermined power capability of the USB cable.

3 Claims, 6 Drawing Sheets

700

710 — CONTROL COMMUNICATIONS IN A CONFIGURATION CHANNEL OF A USB CABLE COUPLED BETWEEN A USB SOURCE DEVICE AND USB SINK DEVICE

720 — INTERCEPT A SOURCE CAPABILITY MESSAGE FROM THE USB SOURCE DEVICE VIA THE CONFIGURATION CHANNEL TO DETERMINE POWER CAPABILITIES OF THE USB SOURCE DEVICE

730 — REGULATE THE SOURCE CAPABILITY MESSAGE BASED ON A DETERMINED POWER CAPABILITY OF THE USB CABLE

REGULATION CIRCUIT TO FACILITATE USB CABLE COMPLIANCE

CROSS-REFERENCE TO RELATED APPLICATION

This application claims the benefit of U.S. Provisional Patent Application 62/509,545 filed on May 22, 2017, and entitled Safe USB Type-C Cable, the entirety of which is incorporated by reference herein.

TECHNICAL FIELD

This disclosure relates to electrical circuits, and more particularly to a regulation circuit to control power delivered by a universal serial bus cable.

BACKGROUND

New universal serial bus (USB) power-delivery (PD) and Type-C specifications have been released that enable delivery of higher power over USB cables and connectors. The intent for this technology is to create a universal power plug for laptops, tablets, and so forth that may use more than 5V. The USB-PD specification defines a communication link between ports connected via USB-PD cables and connectors. The communication is designed to be half-duplex and packet-based. The packets include various information that enables the two ports to communicate and negotiate the voltage and current the source port will provide to the sink port. The ports can also negotiate to switch roles (Source to Sink and vice versa). The underlying communication in the USB PD specification is Biphase Mark Coding (BMC). This communication happens independently from normal USB communications that route through the same cable but using different wires.

Another part of the system is the USB cable itself that connects the source and sink devices. There are a variety of cable types defined including cables that can carry 3A and some that can carry 5A. As the current increases through the cable, the IR drop on the power wire and the ground wire increases proportional to their respective resistance. Cables are not allowed to exceed a certain IR drop in order to avoid interfering with communications between the sink device and the source device. Meeting these requirements sometimes means making the cables thicker than desired to achieve the required electrical resistance. Some USB source device manufacturers may ignore cable power limitations and supply maximum power which may exceed that of the USB cable.

SUMMARY

This disclosure relates to a regulation circuit to control power delivered by a universal serial bus cable. In one example, a circuit includes a regulation circuit configured to intercept messages on a configuration channel of a universal serial bus (USB) cable between a USB source device and a USB sink device. The regulation circuit regulates a source capability message from the USB cable configuration channel based on a predetermined power capability of the USB cable.

In another example, a system includes a universal serial bus (USB) cable that includes at least one power connection and a configuration channel. The USB cable delivers power between a USB source device and a USB sink device via the power connection and enables negotiation of power capabilities between the USB source device and the USB sink device via the configuration channel. A regulation circuit is configured to control communications between the USB source device and USB sink device by controlling the configuration channel between the devices. The regulation circuit includes a switching circuit to control communications on the configuration channel between the USB source device and USB sink device. The regulation circuit includes a controller configured to control the switching devices and to format source capability messages to the USB sink device based on received source capability messages from the USB source device. The regulation circuit includes an activity detector to notify the controller of detected communications on the configuration channel by the USB source device or the USB sink device. The regulation circuit includes a receiver to receive messages via the switching circuit from the USB source device or the USB sink device. The regulation circuit includes transmitter to transmit messages via the switching circuit to the USB source device or the USB sink device, wherein the controller is configured to intercept a source capability message from the receiver via the configuration channel to determine power capabilities of the USB source device and modifies the source capability message sent to the USB sink device to the transmitter via the configuration channel if the power capability of the USB source device exceeds the power capability of the USB cable.

In yet another example, a method includes controlling communications in a configuration channel of a USB cable coupled between a USB source device and USB sink device. The method includes intercepting a source capability message from the USB source device via the configuration channel to determine power capabilities of the USB source device. The method includes regulating the source capability message based on a determined power capability of the USB cable.

DETAILED DESCRIPTION

This disclosure relates to a regulation circuit to control power delivered by a universal serial bus (USB) cable. Some non-compliant USB sources may provide maximum power to be delivered by a USB cable without determining if the cable is designed for passing such power. The regulation circuit described herein is connected between a communications connection between a USB source device and a USB sink device. If the USB source device advertises a power capability greater than what can be carried by the USB cable, the regulation circuit modifies the source capability message provided by the USB source device before delivering it to the USB sink device. In this manner, the sink device may then request a lesser amount of power from the USB source device than what the USB source device originally advertises. As such, the power delivery scheme regulation circuit is in compliant with the power carrying capabilities of the cable.

A universal serial bus (USB) cable (e.g., USB Type C cable) is provided that includes at least one power connection and a configuration channel (CC) connection. The USB cable delivers power between the USB source device and the USB sink device via the power connection and enables negotiation of power capabilities between the USB source device and the USB sink device via the configuration channel. The regulation circuit includes a switching circuit to control communications between the USB source device and USB sink device by controlling the configuration channel between the devices (e.g., using controlled switches to activate and/or deactivate the configuration channel from the USB source or sink device).

A controller (or state machine) configured within or outside of the regulation circuit monitors communications of the configuration channel. This includes regulating (e.g., modifying or ignoring) a source capability message from the USB source device via the configuration channel to determine power capabilities of the USB source device. The controller modifies the source capability message before sending it to the USB sink device (or passes it through if the message is compliant with cable power requirements) if the power capability of the USB source device exceeds the power capability (e.g., a non-compliant message) of the USB cable. Power data objects (PDO) in the source capability message can be altered by the controller to change the source capability message to the USB sink device if the advertised voltage and/or current from the USB source device exceeds the capability of the USB cable.

As used herein, the term "circuit" can include a collection of active and/or passive elements that perform a circuit function, such as an analog circuit or control circuit. Additionally or alternatively, for example, the term "circuit" can include an integrated circuit (IC) where all and/or some of the circuit elements are fabricated on a common substrate (e.g., semiconductor substrate, such as a die or chip).

Figure 1:
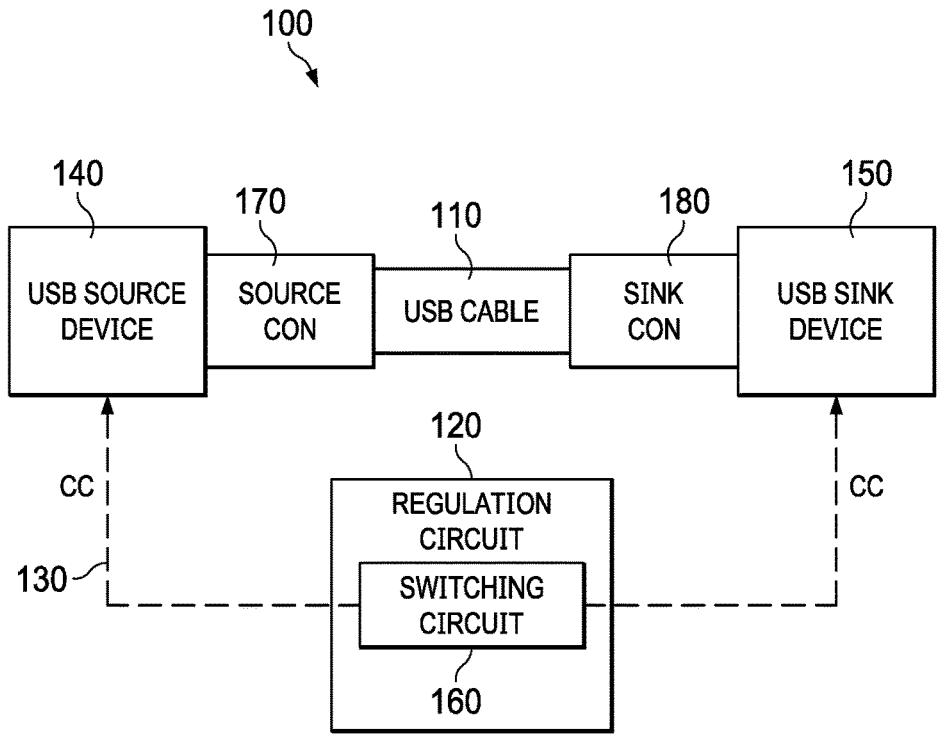
FIG. 1 illustrates an example block diagram of a universal serial bus (USB) cable that includes a regulation circuit to facilitate power compliance of the cable.

FIG. 1 illustrates an example a universal serial bus (USB) cable 110 that operates with a regulation circuit 120 (e.g., regulated e-marker circuit) to facilitate power compliance of the USB cable 110. As used herein, the term regulation refers to monitoring power capability messages between source and sink devices and deciding whether to modify messages that may exceed the power capabilities of the USB cable. The regulation circuit herein does not directly regulate voltages of the source device but can modify messages (or ignore messages) of the source device that may exceed the power capability of the cable. The USB cable 110 includes at least one power connection (see e.g., FIG. 2) and a configuration channel (CC) connection 130. The USB cable 110 delivers power between a USB source device 140 and a USB sink device 150 via the power connection and enables negotiation of power capabilities between the USB source device and the USB sink device via the configuration channel 130. The regulation circuit 120 includes a switching circuit 160 to control communications between the USB source device 140 and USB sink device 150 by regulating the configuration channel 130 between the devices. The regulation circuit 120 intercepts a source capability message from the USB source device 140 via the configuration channel 130 to determine power capabilities of the USB source device based on the message and in view of stored power capabilities of the cable. The regulation circuit modifies the source capability message, in one example, (or passes through if message compliant) sent to the USB sink device 150 if the power capability of the USB source device exceeds the power capability of the USB cable 110. In an alternative example, the regulation circuit can decide to not respond to source capability messages that exceed the power capability of the cable. In that case, a timeout condition could occur where the source would then offer lower power in a subsequent message in order to attempt to comply with the regulation circuit 120.

As shown, the USB cable 110 includes a source connector 170 to connect to the USB source device 140 and a sink connector 180 to connect to the USB sink device 150. The regulation circuit 120 can be located in or near the source connector 170, the sink connector 180, and/or an extended portion of the USB cable 110. Also, the regulation circuit 120 can be powered by a VBUS connection, a VCONN connection, or both the VBUS and the VCONN connections in the USB cable 110 (see, e.g., FIG. 2). Since providing the VBUS voltage is a minimum requirement of the USB specification, the regulation circuit 120 can be solely powered from the VBUS connection if desired. As will be illustrated and described below with respect to FIGS. 3 and 5, the regulation circuit 120 includes a power regulator to regulate power of the voltage from the VBUS connection or the VCONN connection to a lower voltage for the regulation circuit 120. At least one of a transmitter or a receiver can be employed in the regulation circuit 120 to send or receive data on the configuration channel 130 via a biphase mark coding protocol (BMC) in one example.

The regulation circuit 120 can include a controller (see, e.g., 320 in FIG. 3) to operate the switching circuit 160. The controller controls switching states in the switching circuit based on a detected state of the configuration channel 130. The detected state includes at least one of an idle state, a listen state, a message receive state, a message transmit state, and an intercept and change message state. These states and others are depicted in method diagrams of FIGS. 4 and 6 described below. Tables 1 and 2 provided below describe the switch conditions of the switching circuit 160 based on the detected states. The regulation circuit 120 can also include at least one activity detector to monitor signal activity on the configuration channel 130 and to notify the controller of the detected state based on signal level changes on the configuration channel.

In one example, the regulation circuit 120 modifies the source capability message sent to the USB sink device 150 to be a different voltage or a different current offered by the USB source device 140 based on the voltage or current capabilities of the USB cable (e.g., voltage or current capabilities of cable encoded in controller or state machine memory). The regulation circuit 120 can also modify a power data object (PDO) in the source capability message to change the voltage or the current offered to the USB sink device 150. In another example, the regulation circuit 120 passes through source capability messages from the USB source device to the USB sink device that does not violate the USB cable 110 power capability or regenerates a compliant message to the USB sink device 150 based on the USB source device sending a source capability message that does not violate the USB cable power capability. In some example, the regulation circuit 120 passes through messages unrelated to the power of the source (e.g., such as listen and pass 630 of FIG. 6). In another example, the regulation circuit 120 intercepts and retransmits messages unrelated to the power of the source (e.g., such as intercept and change 460 of FIG. 4).

Figure 2:
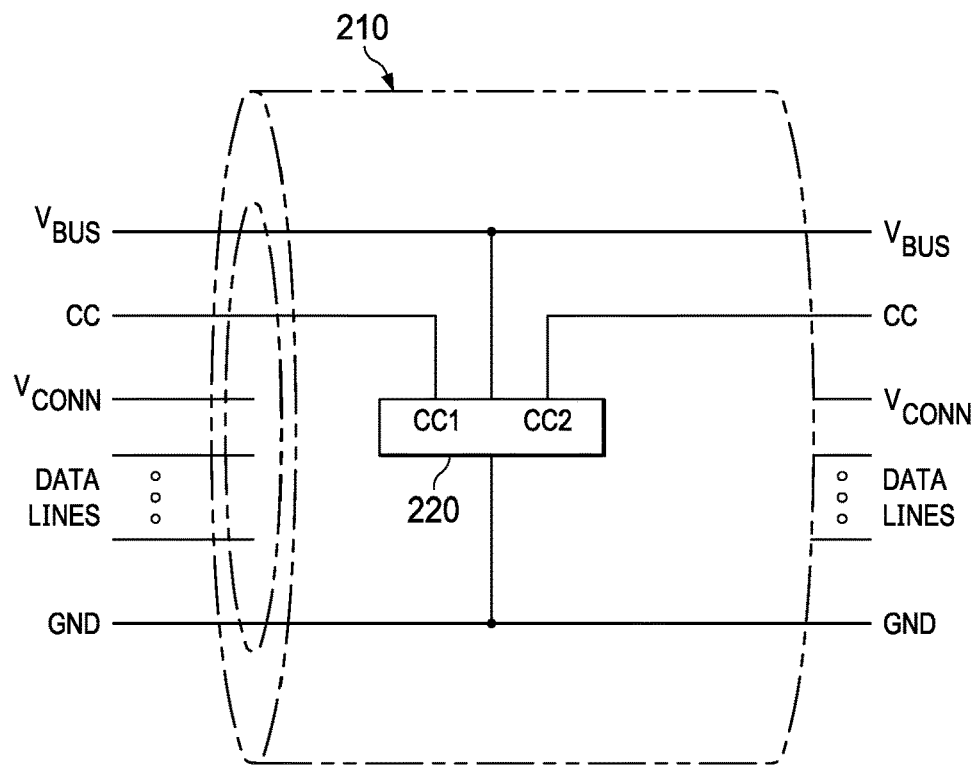
FIG. 2 illustrates an example of a universal serial bus (USB) cable and connections to a regulation circuit to facilitate power compliance of the cable.

FIG. 2 illustrates an example of a universal serial bus (USB) cable 210 and connections to a regulated electronic marker (e-marker) circuit 220 to facilitate power compliance of the cable. As shown, the cable 210 includes a VBUS connection, a VCONN connection, a configuration channel (CC) connection, data lines for normal USB communications, and ground. In this example, the regulation 220 is powered by the VBUS connection but it can also be powered from the VCONN connection as previously noted. Rather than routing the configuration channel straight through the cable as in current systems, the configuration channel is intercepted, switched, and controlled by the regulation circuit 220. As shown, the configuration channel from the left side of the cable 210 is connected to the CC1 connection of the regulation circuit 220 and the Configuration channel on the right side of the cable 210 is connected to the CC2 connection of the regulation circuit. The switch circuit previously described on the e-marker circuit 220 controls intercepting and analyzing messages received on the CC1 connection and altering the messages to communicate a lower power value on the CC2 connection if the original message received on the CC1 connection exceeds the power capability of the USB cable 110. Further aspects of the regulation circuit 220 are illustrated and described below with respect to FIGS. 3 and 5.

Figure 3:
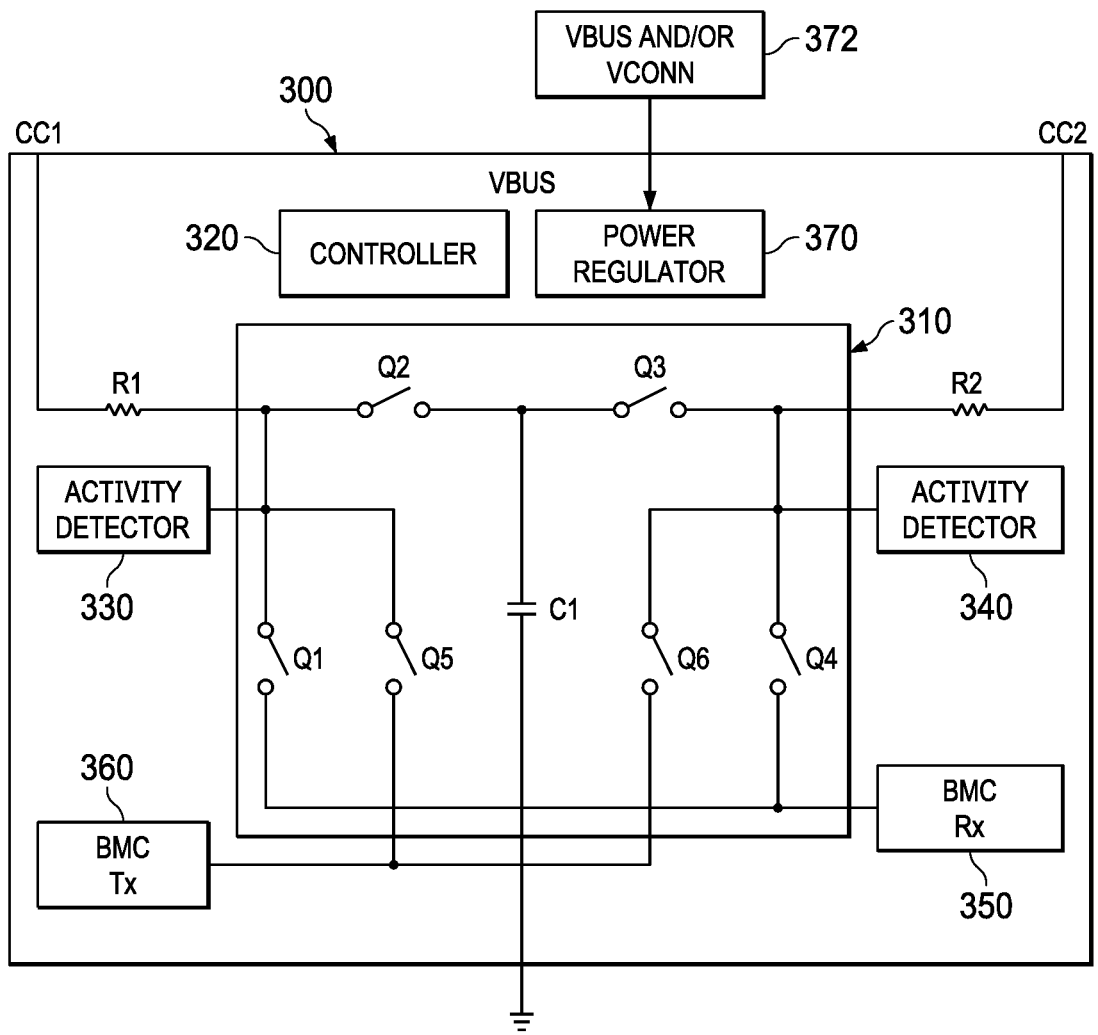
FIG. 3 illustrates an example circuit diagram of a regulation circuit to facilitate power compliance of a universal serial bus (USB) cable.

FIG. 3 illustrates an example of a regulation circuit 300 to facilitate power compliance of a universal serial bus (USB) cable. The regulation circuit 300 controls communications between a USB source device and USB sink device by controlling a configuration channel shown as CC1 and CC2 between the devices. The regulation circuit 300 includes a switching circuit 310 to control communications on the configuration channel between the USB source device and USB sink device. In this example, the switching circuit 310 includes switches Q1, Q2, Q3, Q4, Q5, and Q6. Functional operation of the respective switches Q1 through Q6 is described below in Table 1 and with respect to the state method diagram of FIG. 4.

Figure 4:
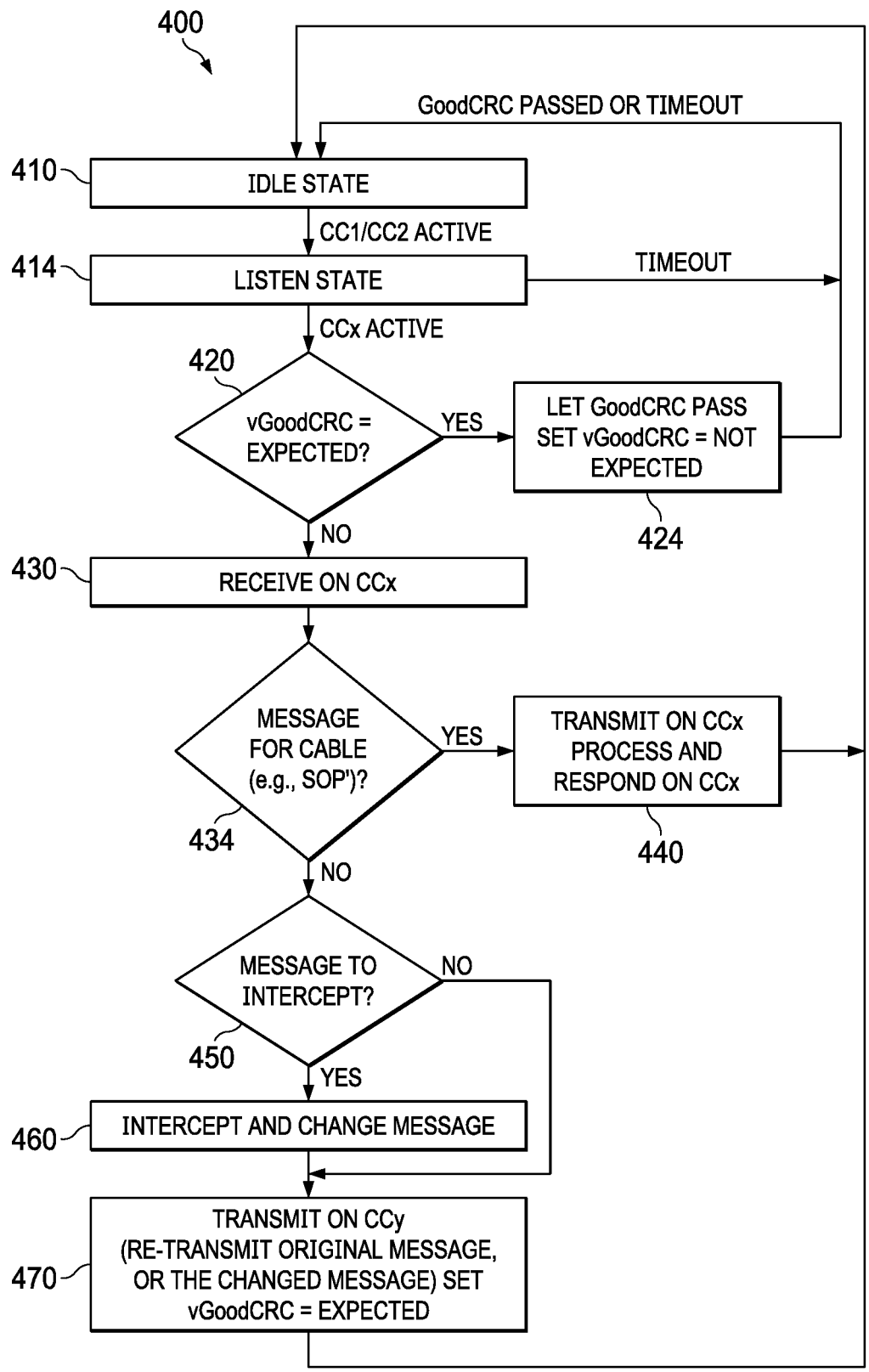
FIG. 4 illustrates an example method to control switching circuits of the regulation circuit depicted in FIG. 3.
Figure 6:
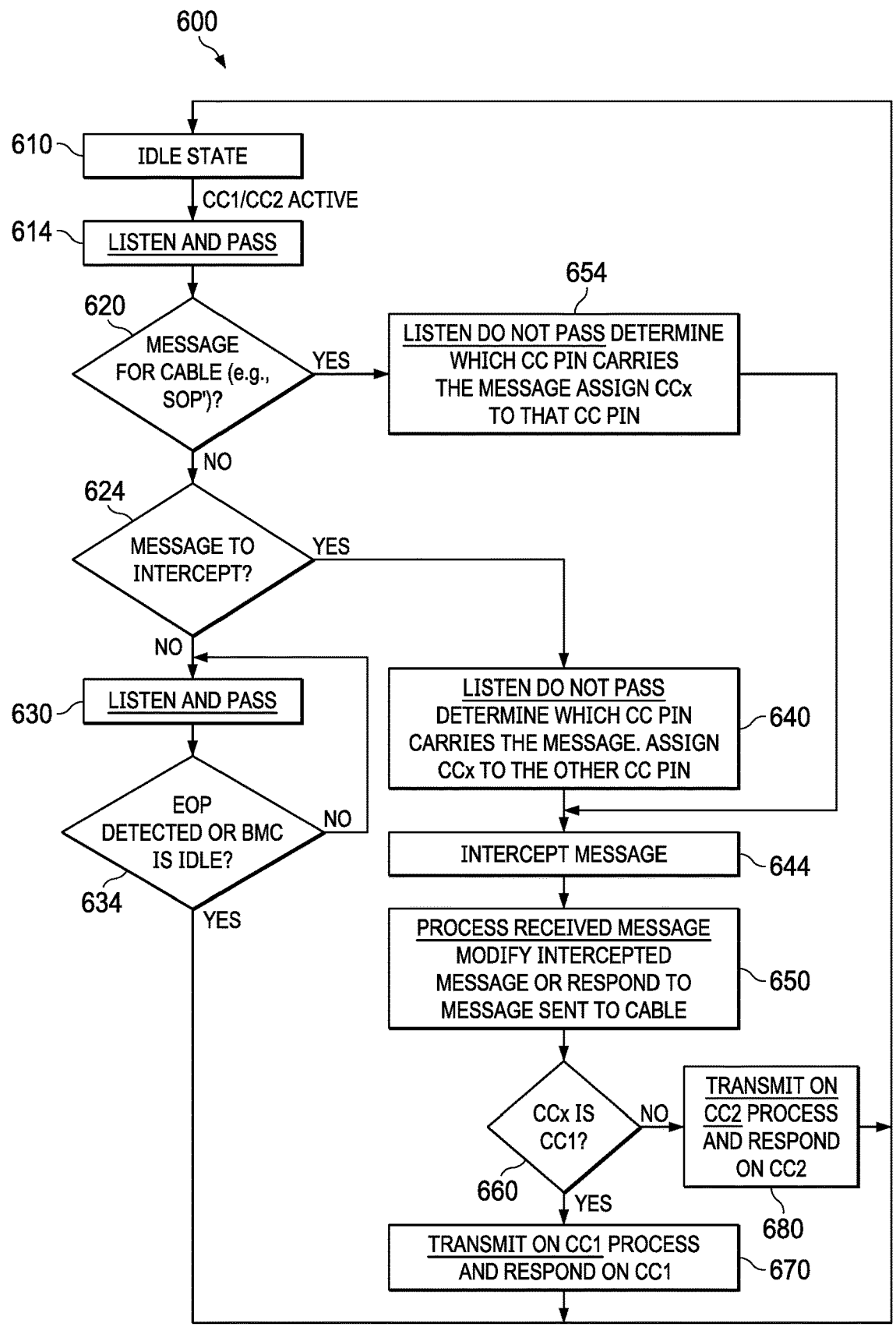
FIG. 6 illustrates an example method to control switching circuits of the regulation circuit depicted in FIG. 5.

The regulation circuit 300 includes a controller 320 operated by the state machine of FIG. 4 or 6 to control the switching devices in the switching circuit 310 and to format source capability messages to the USB sink device based on received source capability messages from the USB source device. Activity detectors (AD) 330 and 340 notify the controller 320 of detected communications on the configuration channel by the USB source device or the USB sink device. The regulation circuit 300 includes a receiver 350 to receive messages via the switching circuit 310 from the USB source device or the USB sink device. The regulation circuit 300 includes a transmitter 360 to transmit messages via the switching circuit 310 to the USB source device or the USB sink device.

The controller 320 monitors a source capability message from the receiver 350 via the configuration channel to determine power capabilities of the USB source device and modifies the source capability message sent to the USB sink device to the transmitter 360 via the configuration channel if the power capability of the USB source device exceeds the power capability of the USB cable. The regulation circuit 300 includes a power regulator 370 to regulate the voltage from the VBUS connection and/or the VCONN from connection 372 to a lower voltage for the regulation circuit (e.g., buck switching power supply). As noted previously, the transmitter 360 or the receiver 350 can send or receive data on the configuration channel via a biphase mark coding protocol (BMC). Also, the regulation circuit 300 can include a low pass filter on the configuration channel that includes capacitor C1 and resistor R1 or R2 depending of the setting of the switches in the switching circuit 310. The low pass filter prevents messages from being passed on the configuration channel and allows direct current (DC) voltage level to pass through on the configuration channel. In some examples, the DC level of the configuration channel can also be used to communicate information and thus, the low pass filter mitigates interruptions to such DC level communications. The filter can be set with a corner frequency of about 65 kHz to filter out 600 kHz USB BMC signal interference, for example. Operations of the regulation circuit 300 are illustrated described below with respect to the method of FIG. 4.

Figure 7:
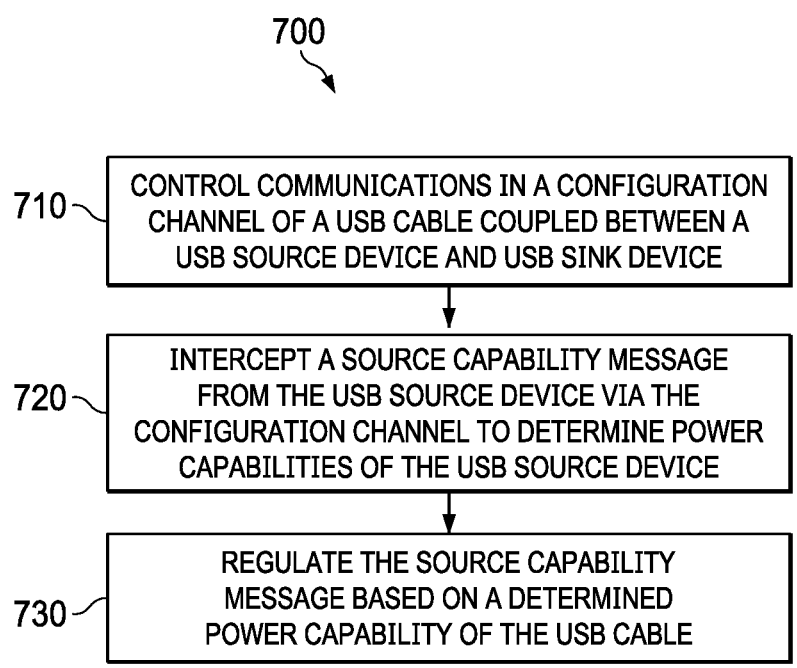
FIG. 7 illustrates an example method to facilitate power compliance of a universal serial bus cable (USB).

In view of the foregoing structural and functional features described above, example methods will be better appreciated with reference to FIGS. 4, 6, and 7. While, for purposes of simplicity of explanation, the methods are shown and described as executing serially, it is to be understood and appreciated that the methods are not limited by the illustrated order, as parts of the methods could occur in different orders and/or concurrently from that shown and described herein. Such methods can be executed by various hardware circuits and components configured to execute machine readable instructions stored in memory and executable by an integrated circuit or a processor, for example.

FIG. 4 illustrates an example method 400 to control switching circuits of the regulated electronic marker (e-marker) circuit depicted in FIG. 3. A brief description of the process flow of the method 400 is provided followed by a more detailed description of the respective states and conditions of the method. At state 410, an idle state for the regulation is exited based on detected activity of the CC1 or CC2 lines. At state 414, a listen state is entered to determine which line—the CC1 or the CC2 state was active. At state 420, a flag "vGoodCRC" is monitored. If the flag is set to expected, the process proceeds to 424 and resets the flag to not expected and proceeds back to the idle state at state 410. If the flag is set to not expected at state 420, the process proceeds to 430 and receives messages on the CC line where activity was detected. At state 434, if a message was detected for the cable, the process proceeds to 440 and transmits on the same CC line from that received at state 430. Also at state 440, if a GoodCRC message with start of packet (SOP)' or SOP" frame is processed at state 440, then no transmission occurs at state 440. If the message was not for the cable at state 434, a determination is made whether or not to intercept the message at state 450. If so, the message is intercepted and changed at 460 and transmitted as a changed message at state 470. If the message is not to be changed as determined at state 450, the process proceeds to state 470, transmits the original source capability message before proceeding back to the idle state at state 410. Alternatively at state 470, instead of retransmitting the respective message, the message could be passed through without further processing.

The process at state 460 for "Intercept and Change Message" can be implemented in several ways. First, it may intercept the USB PD Request message from the Sink and override the requested current, voltage and/or power in order to limit the current to the amount the cable can support. A second method is to intercept the Source Capabilities USB PD message sent by the Source and modify the current, voltage and/or power it offers to what the cable can support. Other messages that the source may send may be intercepted also, for example, to inform the sink that the cable is limiting the amount of power. Other bit fields in the message are not modified. For example, the message identifier (ID). In examples where the cable wants to limit the voltage, it may remove respective power data objects (PDO's) from the source capabilities message. For example, if the source capabilities message contains four PDO's for 5V, 9V, 15V, and 20V a Type-C cable that cannot tolerate 20 V may remove the 4th PDO when it retransmits the message. In that case, the fields that specify the length of the message is also to be modified including the Number of Data objects. If one or more bits is changed in the message, then the cyclic redundancy check (CRC) that is appended to the end of the message may be different. The regulation performs its own CRC calculation in order to append the proper CRC.

At state 424, the "GoodCRC passed" condition can be determined by the BMC Rx processing the message or by one of the activity detector circuits determining that the CC bus is idle. The CC bus is idle if there are no longer any BMC bit transitions detected within a certain time window. The "Let GoodCRC pass" state may also start a timer on the order of 1.2 ms by which time a GoodCRC message should have finished. If the message is determined not to be a GoodCRC message, then the regulation may proceed to the or CC2, then the "CCx active" condition is true and it is determined that a BMC signal is arriving on the CCx pin. Some USB PD messages are intended for the cable itself. Those messages have a frame marker called SOP', SOP", SOP'_DBG, SOP"_DBG, or Cable Reset. These messages can be processed in the same manner specified by the USB PD specification which is publicly available. The regulation processes those messages and responds to them in the normal way on the same CC pin (either CC1 or CC2) that the received message arrived on. Messages that have a frame marker called SOP or Hard Reset are intended for the device at the other end of the cable and should to be intercepted and changed or repeated or passed through on the other CC pin.

The GoodCRC message should be received by the sender of a message within about 0.9 ms so it is easier for the regulation to let that message pass. The vGoodCRC variable in the flow chart enables this. Other messages can be delayed by as much as about 9 ms without causing timing issues. For example, the time within the responder is to respond is generally about 15 ms (tReceiverResponse), but the recipient of a message should wait for at least about 24 ms (tSenderResponse). This built in margin in the USB PD specification allows time for the regulation to intercept and modify the messages. The following table 1 shows the switch settings of the switch circuit 300 of FIG. 3 as they are set in response to the various states described in FIG. 4.

TABLE 1

| | Q1 | Q2 | Q3 | Q4 | Q5 | Q6 |
|---|---|---|---|---|---|---|
| Idle state<br>Connect CC1 to CC2 through a bi-directional low-pass filter. This should be the default state when the e-marker is unpowered. CC1 and CC2 are monitored by BMC idle circuits. | OFF | ON | ON | OFF | OFF | OFF |
| Receive on CC1<br>Q5 or Q6 could be ON, but not both. | ON | OFF | OFF | OFF | X | X |
| Receive on CC2<br>Q5 or Q6 could be ON, but not both. | OFF | OFF | OFF | ON | X | X |
| Transmit on CC1<br>Q1 or Q4 could be ON, but not both. | X | OFF | OFF | X | ON | OFF |
| Transmit on CC2<br>Q1 or Q4 could be ON, but not both. | X | OFF | OFF | X | OFF | ON |
| Let GoodCRC pass<br>Remove low pass filter (LPF), and connect CC1 and CC2. Other switch configurations can also achieve this. Circuit to monitor for BMC activity on CC1 or CC2 still running. | ON | OFF | OFF | ON | OFF | OFF |
| Listen State:<br>Remove LPF, but BMC Rx does not need to be connected yet. Whether the signal is arriving on CC1 or CC2 is to be determined. | OFF | OFF | OFF | OFF | OFF | OFF |

Idle State at 410 to prevent the message from passing. The "CC1/CC2 Active" condition is determined by the voltage on CC1 and CC2 which are connected in this state. The low-pass filter is connected to the CCx pins, so a BMC transmission will be filtered to a near DC voltage. However, the DC voltage will be different. The condition "CC1/CC2 Active" is true when the DC voltage has a change significant enough to be indicative of a transmission. The DC voltage for a transmission should not match the DC voltage when no transmission is in progress.

In the "Listen State" at state 414, the low-pass filter is removed. If a true BMC signal is not detected within a predetermined time, then the regulation goes back to the Idle state at state 410. In the "Listen State" at state 414, the activity detectors are watching CC1 and CC2 respectively. In some examples, a single activity detector can sequentially monitor both pins. When bit transitions are detected on CC1

Figure 5:
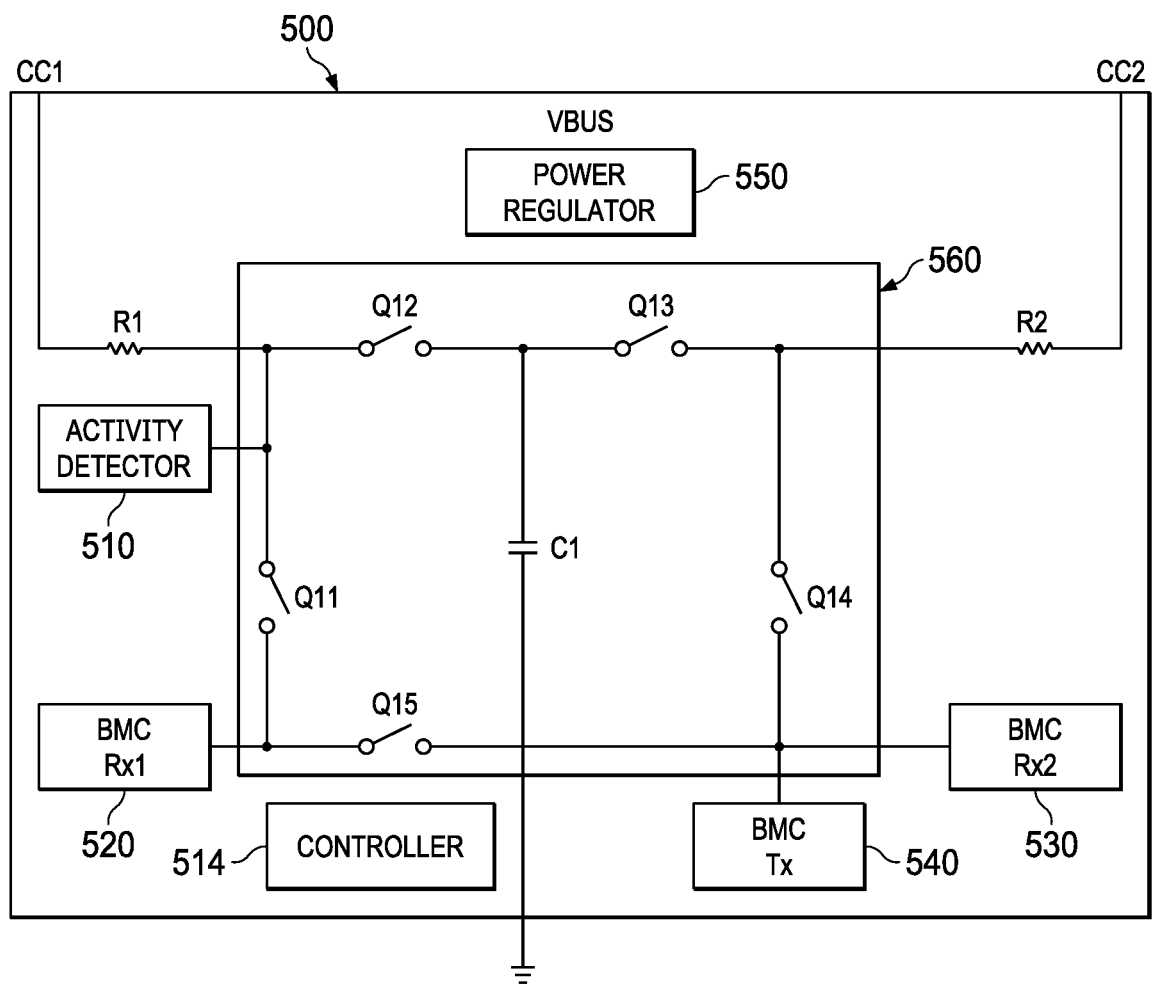
FIG. 5 illustrates an example circuit diagram of an alternative regulation circuit to facilitate power compliance of a universal serial bus (USB) cable.

FIG. 5 illustrates an example of an alternative regulation circuit 500 to facilitate power compliance of a universal serial bus (USB) cable. In this example, the regulation circuit 500 passes cable compliant power messages to the sink device unaltered. In the previous circuit 300 and associated method 400, compliant messages were regenerated by the regulation circuit. In this example, a single activity detector 510 monitors for detected CC line activity and drives a controller 514. Two receivers 520 and 530 are employed to receive messages on the CC1 line and the CC2 lines respectively. A transmitter 540 is provided to generate new messages in place of detected non-compliant power messages from the source device. A power regulator 550 is similarly provided to regulate incoming voltages from VBUS and/or VCONN supplied to the regulation circuit 500. A switching circuit 560 includes switches Q11, Q12, Q13, Q14, and Q15 which are controlled by the controller 514. Switch operation and control of the regulation circuit 500 is illustrated and described below with respect to FIG. 6.

FIG. 6 illustrates an example method 600 to control switching circuits of the regulation circuit depicted in FIG. 5. At state 610, the method 600 begins in the idle state. If CC1 or CC2 activity is detected, the method 600 proceeds to a listen and pass state at state 614. If the message is not for the cable at state 620, the method proceeds to state 624. At state 624, a determination is made as to whether or not the source message should be intercepted. If not, the method 600 proceeds to state 630 and enters another listen and pass state. At state 634, if end of packet (EOP) is not detected or the BMC coding has not gone idle, the method proceeds back to state 630. If an EOP or idle state is detected at state 634, the method proceeds back to the idle state at state 610.

At state 624, if it is determined that a message should be intercepted, then the method enters a listen and do not pass state at state 640 and determines which CC pin carries the message. At state 644, the intercept message is generated and passed to a process received message state at state 650. The process received message state can also be entered upon a message for cable event being determined as YES at state 620 which proceeds to a listen and do not pass state at state 654 before proceeding to state 650. At state 660, a determination is made as to whether the received message is from CC1. If so and the flow has passed through state 654, the method proceeds to 670 and transmits on CC1 before returning to the idle state at state 610. If so and the flow has passed through state 640, the method proceeds to state 670 and transmits on CC2 before returning to the idle state at state 610. If not at state 660, the process proceeds to state 680 and transmits on CC2. The following table 2 shows the switch settings of the switch circuit 500 of FIG. 5 as they are set in response to the various states described in FIG. 6.

TABLE 2

| | Q11 | Q12 | Q13 | Q14 | Q15 |
|---|---|---|---|---|---|
| Idle state Connect CC1 to CC2 through a bi-directional low-pass filter. This should be the default state when the e-marker is unpowered. CC1 and CC2 are monitored by BMC Activity Detector circuit. | OFF | ON | ON | OFF | OFF |
| Listen and Pass Listen with one BMC Rx and let message pass through between CC1 and CC2. | ON | OFF | OFF | ON | ON |
| Listen do not Pass Each BMC Rx listens to a CC pin. message is not passed between CC1 and CC2. | ON | OFF | OFF | ON | OFF |
| Transmit on CC1 | ON | OFF | OFF | OFF | ON |
| Transmit on CC2 | OFF | OFF | OFF | ON | X |

FIG. 7 illustrates an example method 700 to facilitate power compliance of a universal serial bus cable (USB). At state 710, the method 700 includes controlling communications in a configuration channel of a USB cable coupled between a USB source device and USB sink device. At state 720, the method 700 includes intercepting a source capability message from the USB source device via the configuration channel to determine power capabilities of the USB source device. At state 730, the method 700 includes regulating the source capability message based on a determined power capability of the USB cable. The method 700 can also include passing through source capability messages from the USB source device to the USB sink device that does not violate the USB cable power capability. This can include regenerating a compliant source capability message to the USB sink device based on the USB source device sending a source capability message that does not violate the USB cable power capability.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system, comprising:
a universal serial bus (USB) cable that includes at least one power connection and a configuration channel, the USB cable delivers power between a USB source device and a USB sink device via the power connection and enables negotiation of power capabilities between the USB source device and the USB sink device via the configuration channel; and
a regulation circuit configured to control communications between the USB source device and USB sink device by controlling the configuration channel between the devices, the regulation circuit further comprising:
a switching circuit to control communications on the configuration channel between the USB source device and USB sink device;
a controller configured to control the switching circuit and to format source capability messages to the USB sink device based on received source capability messages from the USB source device;
an activity detector to notify the controller of detected communications on the configuration channel by the USB source device or the USB sink device;
a receiver to receive messages via the switching circuit from the USB source device or the USB sink device; and
a transmitter to transmit messages via the switching circuit to the USB source device or the USB sink device, wherein the controller is configured to intercept a source capability message from the receiver via the configuration channel to determine power capabilities of the USB source device and modifies the source capability message sent to the USB sink device to the transmitter via the configuration channel if the power capability of the USB source device exceeds the power capability of the USB cable.

2. The system of claim 1, wherein the controller is configured to modify the source capability message sent to the USB sink device to be a different voltage or a different current offered by the USB source device based on voltage or current capabilities of the USB cable.

3. The system of claim 2, wherein the controller is configured to modify a power data object (PDO) in the source capability message to change voltage or current offered to the USB sink device.

* * * * *